United States Patent [19]

Sotiropoulos

[11] 4,326,604
[45] Apr. 27, 1982

[54] VEHICLE LUBRICATION SYSTEM

[76] Inventor: Peter Sotiropoulos, 42-11 78th St., Elmhurst, N.Y. 11373

[21] Appl. No.: 85,045

[22] Filed: Oct. 15, 1979

[51] Int. Cl.³ .................. F16N 13/22; F16N 25/00
[52] U.S. Cl. .................. 184/7 C; 137/625.11
[58] Field of Search ............ 184/7 C, 7 CR, 54, 6.4; 137/625.11

[56] References Cited

U.S. PATENT DOCUMENTS

| | | | |
|---|---|---|---|
| 1,292,138 | 1/1919 | Sullivan et al. | 184/7 C |
| 1,552,704 | 9/1925 | Jensen | 184/7 C X |
| 1,673,410 | 6/1928 | Larson | 184/7 C X |
| 1,737,570 | 12/1929 | Collins | 184/7 C X |
| 2,515,900 | 7/1950 | Schulhoff | 184/7 C X |
| 2,823,768 | 2/1958 | Taylor | 184/7 C |
| 2,834,376 | 5/1958 | Hughes | 184/7 C |
| 2,888,098 | 5/1959 | Florence | 184/7 C |

*Primary Examiner*—David H. Brown

[57] ABSTRACT

An automatic vehicle lubrication system is disclosed wherein the lubricant is directed successively and selectively to receiving stations, including means for automatically switching and directing the lubricant to successive stations receiving a predetermined quantity of lubricant.

2 Claims, 6 Drawing Figures

FROM COMPRESSOR

VEHICLE LUBRICATION SYSTEM

BACKGROUND OF THE INVENTION

The present invention relates to vehicle lubrication systems and more specifically to an automatic pre-programmed system for lubricating successive receiving stations. Heretofore, vehicle lubrication apparatus have been devised which permit directing lubricant under pressure to a plurality of receiving stations. Such an apparatus is disclosed in U.S. Pat. No. 2,834,376. However, although a lubricating distributing means is disclosed therein, the apparatus does not automatically direct specific, measured quantities of lubricant to respective receiving stations and requires the input of lubricant from an external source. The system of the present invention operates in a contained self-regulating manner, having its own lubricant and pressurizing means therefor and automatic means for dispensing lubricant to the respective receiving stations in prescribed quantities.

SUMMARY OF THE INVENTION

In accordance with the present invention, an apparatus for vehicle lubrication comprises a reservoir adapted to contain a quantity of lubricant, means for pressurizing the reservoir and the lubricant therein, a rotor and rotor housing, duct means defined within the rotor, means connecting the duct means and the reservoir, a plurality of transmitting stations defined by the rotor housing, means for rotating the rotor successively into a plurality of positions to align the duct means with the transmitting stations, conduit means connecting the transmitting stations with vehicle lubricant receiving stations, a motor connected to the rotor for rotating same, means for measuring the flow of lubricant from the reservoir into and through the rotor, means in conjunction with the measuring means for energizing the motor to cause the duct means to be in alignment with one of the receiving stations and means in conjunction with the rotor to deenergize the motor upon alignment of the duct means with one of the receiving stations.

In accordance with a further aspect of the invention, the rotor defines a cam adapted during rotation of the rotor to actuate various switch means which are capable of deenergizing the rotor motor when the duct means in the rotor is brought into alignment with one of the transmitting stations. Reenergization of the motor occurs after a predetermined quantity of lubricant is delivered to a transmitting station through the rotor as determined by the means for measuring the flow of lubricant from the reservoir into and through the rotor.

DESCRIPTION OF A PREFERRED EMBODIMENT

Figure 1:
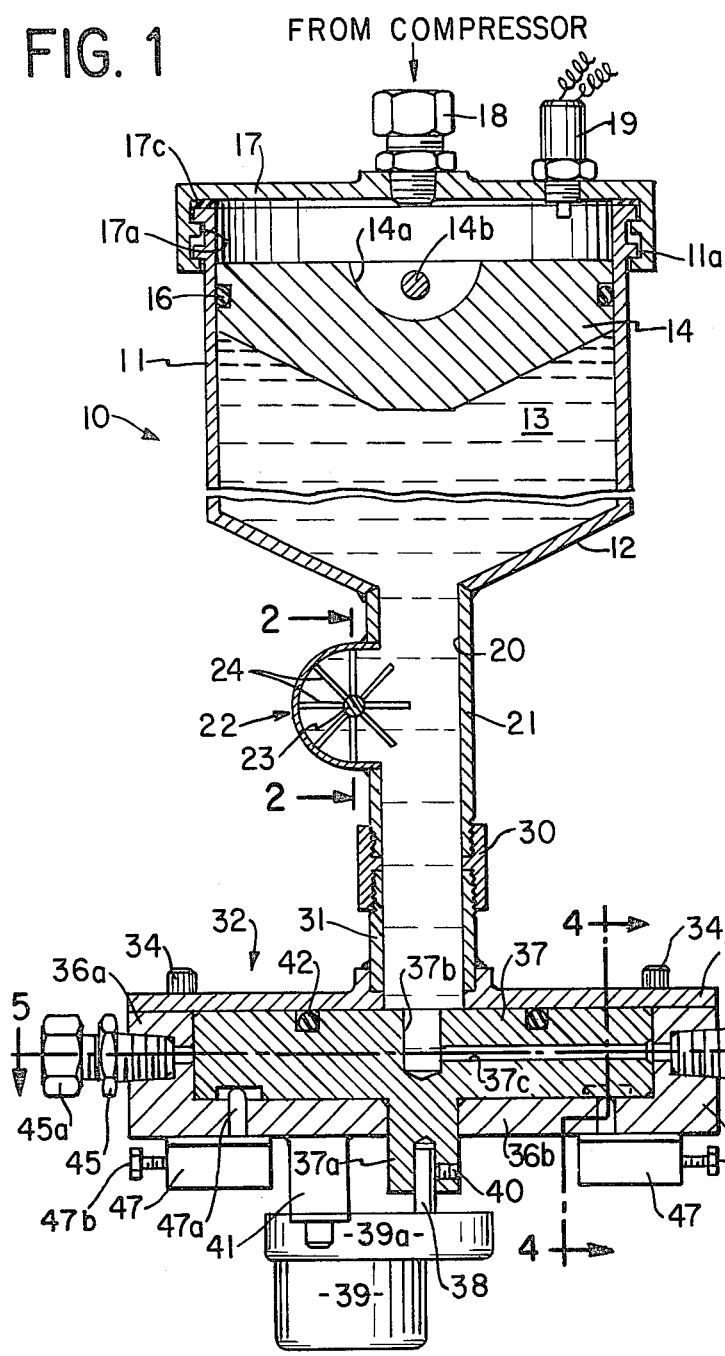
FIG. 1 is a cross sectional view of a vehicle lubrication system or apparatus according to the present invention.

Referring now to the drawing and initially to FIG. 1 thereof, a vehicle lubrication system 10 constructed according to the principles of the present invention has been illustrated. The system 10 includes a generally cylindrical casing 11 including the bottom wall 12 thereof comprising a reservoir containing a quantity of lubricant 13. A piston 14 is slidably fitted within the casing 11 and is maintained in sealing engagement therein by seal 16. The piston 14 is relieved in the area indicated by reference numeral 14a, pin 14b having been provided to permit manual or mechanical removal of the piston 14 when so desired.

The top of casing 11 has been provided at 11a with a bayonet-type thread and a cap 17 provided with a mating thread 17a is attached to the top of the casing in order to form an enclosed reservoir. Additional sealing (not shown) in the form of an O-ring or a rubber gasket may be provided, the object being to have an air-tight seal between cap 17 and casing 11. An air-fitting 18 is threaded into the top of cap 17, the fitting 18 being connected by suitable tubing to an air compressor (not shown). Pressure sensitive switch 19 is similarly threaded into the cap 17.

Figure 2:
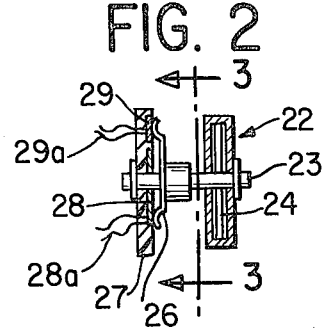
FIG. 2 is a cross sectional view taken in the direction of arrows 2—2 of FIG. 1.
Figure 3:
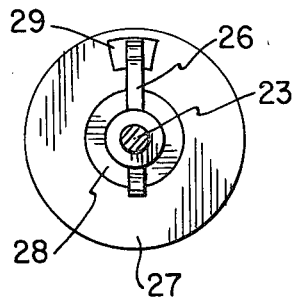
FIG. 3 is a cross sectional view taken in the direction of arrows 3—3 of FIG. 2.

The bottom wall of the lubricant reservoir 11 defines an opening 20 which receives a generally cylindrical housing 21. Within a portion of the housing 21 is a metering device 22 having a shaft 23 upon which is mounted a plurality of vanes 24. The latter intercept the flow of lubricant flowing from the reservoir 11 through housing 21. As seen in FIGS. 2 and 3, shaft 23, in addition to mounting the vanes 24, also supports for rotation contact arm 26. The latter rotates against insulating disc 27 which mounts terminals 28 and 29. Predetermined rotation of contact arm 26 will cause the arm to rotate to a position (see FIG. 3) wherein a circuit is completed between terminals 28 and 29, the latter being connected respectively to wires 28a and 29a. The function of the device 22 will be described subsequently.

The lower end of cylindrical housing 21 is joined by means of connector 30 to a sleeve 31 attached by welding to the upper portion of the vehicle lubrication distributing mechanism 32. The apparatus 32 consists of a circular plate 33 attached by a plurality of bolts 34 to a generally cylindrical rotor housing 36 having side and bottom wall portions 36a, 36b. Within the housing 36 is a rotor 37 having an axial shaft 37a extending from within the housing 37 to project downwardly therefrom. The shaft 37a receives the shaft 38 of gear reduction motor 39. Relative rotation between the respective shafts 38 and 37a being prevented by means of the set screw 40. The reduction gear housing section 39a and the motor 39 are attached to bottom section 36b of housing 36 by cylindrical mounting bracket 41. Thus, energization of motor 39 effects rotation of shaft 38, 37a and rotation of rotor 37 within the housing 36.

Figure 5:
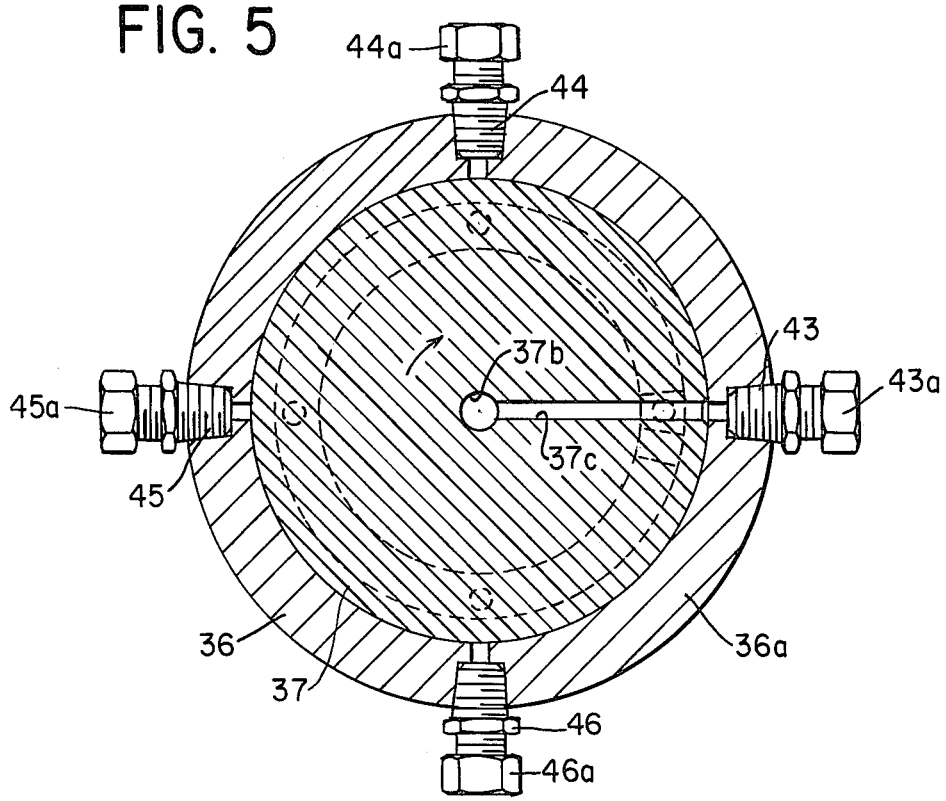
FIG. 5 is a cross section taken in the direction of arrows 5—5 of FIG. 1.

Rotor 37 has been provided with an axial opening 37b which communicates with the interior of cylindrical housing 21 and 31. Sealing 42 prevents the flow of lubricant laterally. A radial passage 37c within the rotor 37 is in communication with the axial opening or passage 37b. Lubricant transmitting stations 43–46 (see FIG. 5) are peripherally defined by the rotor housing 36, and rotation of the rotor will cause alignment of passage 37c with successive stations 43-46. Each of the stations is equipped with lubricant tight fittings 43a-46a which connect by suitable tubing means (not shown) with a receiving station which is to receive the lubrication. For illustrative purposes, four fittings have been shown. A fewer or greater number of fittings and corresponding stations may be accommodated by the apparatus of the present invention.

Figure 4:
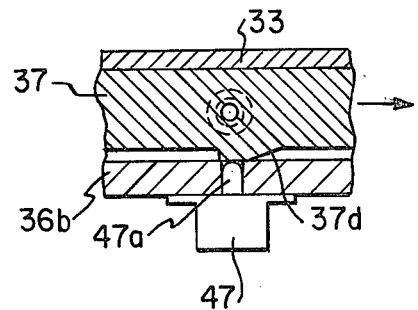
FIG. 4 is a cross section taken in the direction of arrows 4—4 of FIG. 1.

With reference to FIGS. 1 and 4, it will be seen that the bottom portion of rotor 37 defines a cam surface 37d. Mounted to the bottom of the rotor housing 36 are a plurality of normally closed, double-throw switches 47, four in number, each one corresponding to one of the respective receiving stations 43-46. The plungers 47a are in the path of cam surface 37d, and when depressed thereby (see FIG. 4) during rotation of rotor 37 will open a switch 47 to effect deenergization of motor 39. The relationship of cam surface 37d and switches 44 is such as to deenergize motor 39 to bring radial passage 37c into alignment with the transmitting station associated with the switch actuated by the cam surface 37d. In the event that a receiving station is not in use, the threaded screw 47b of the switch 47 associated with such receiving station may be rotated to bridge the contacts of the switch, rendering the plunger 47a inoperative to open the switch and to deenergize motor 39 at that station. Rotor 37 will thus rotate past the unused station and will be caused to stop by the next operative switch 47 at an alternate station.

Figure 6:
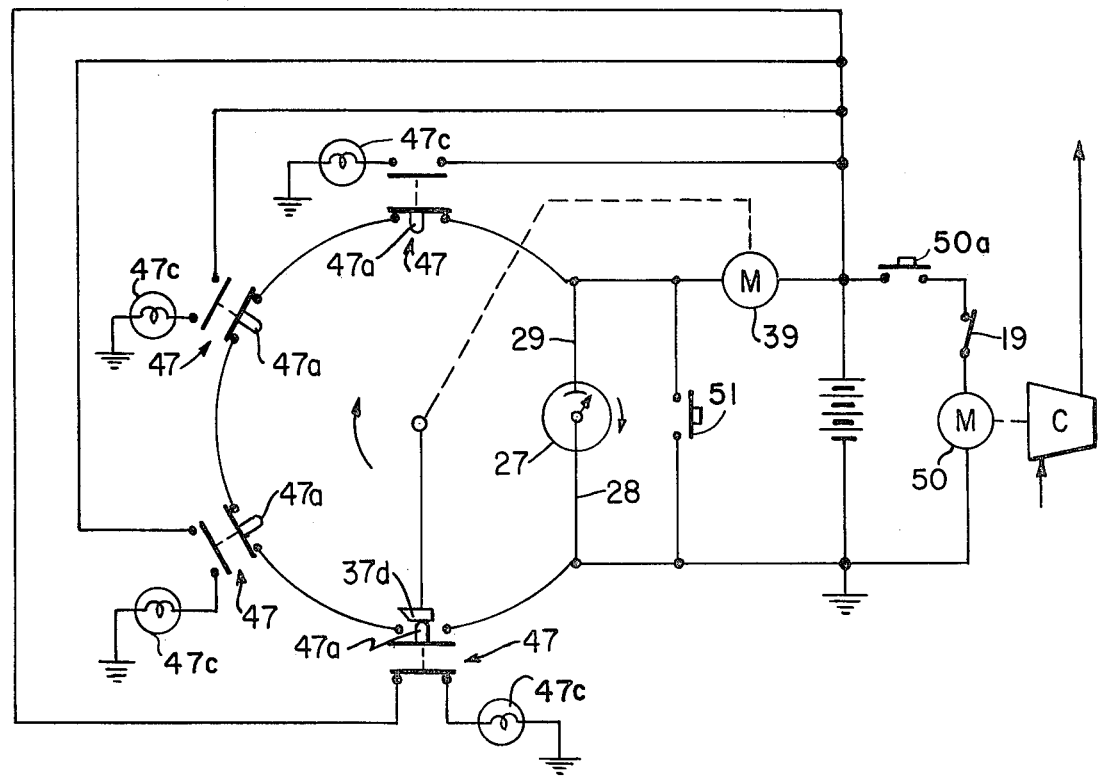
FIG. 6 is a schematic diagram illustrating the operation of electro-mechanical portions of the vehicle lubrication system of the invention.

The operation of the vehicle lubricant system and apparatus according to the present invention will now be described. Referring to FIG. 6, the motor 50 of air compressor "C" may be actuated by the "start compressor" switch 50a to build up pressure above piston 14 within the reservoir 11. Pressure switch 19 will be set at an appropriate pressure sensing level (for example, 40 pounds) and will shut off the air compressor when that level has been reached or restart the air compressor when the pressure sense falls below the pressure level to be maintained above piston 14. Motor 39 may be initially energized by the manual switch 51. Assuming that the rotor 37 is in a dispensing position and has been stopped by the action of a switch 47, an indicator light 47c associated with such switch will be illuminated. Radial duct 37c will have been brought into alignment with one of the transmitting stations 43-46, pressure upon piston 14 will be transmitted to the lubricant 13 to cause flow thereof through passages 21 and 31 into the axial passage 37b in the rotor and thence into passage 37c. Flow of lubricant through passage 21 will be measured by the rotative movement of vanes 24 of the measurizing device 22, thus causing corresponding rotation of contact arm 26. After a complete revolution of the contact arm, contact will occur with terminals 28 and 29 making a circuit with distributing motor 39 to start the motor. Energization of motor 39 effects rotation of rotor shaft 37a to begin moving the radial passage 37c away from one transmitting station 43-46 into alignment with another transmitting station. The rotor 37 is stopped in a position of such alignment when the cam 37d formed upon the undersurface of the rotor contacts a switch plunger 47a of one of the switches 47 thus breaking a circuit energizing motor 39. This permits the cycling to be repeated as described.

It will be understood that the foregoing description has been of a particular embodiment of the invention and is therefore merely representative. In order to understand fully the scope of the invention, reference should be made to the appended claims.

I claim:

1. An apparatus for vehicle lubrication comprising a reservoir adapted to contain a quantity of lubricant, means for pressurizing said reservoir and said lubricant therein, a rotor and a rotor housing, duct means defined within said rotor, means connecting said duct means and said reservoir, a plurality of transmitting stations defined by said rotor housing, means for rotating said rotor successively into a plurality of positions to align said duct means with said transmitting stations, means for measuring the flow of lubricant from said reservoir into and through said rotor, means in conjunction with said measuring means for energizing said means for rotating said rotor, and means in conjunction with said rotor to deenergize said motor upon alignment of said duct means with one of said receiving stations.

2. The apparatus according to claim 1 wherein there are means responsive to the flow of lubricant into and through said rotor, said means including a plurality of vanes for intercepting said flow, a shaft for mounting said vanes, a switch contact arm co-axially mounted on said shaft and contact terminals for forming a circuit with said switch contact arm after predetermined rotation of said shaft by said vanes.

* * * * *